Dec. 7, 1965  E. J. MELLEN, JR., ETAL  3,222,435
INJECTION MOLDING OF CERAMIC CORES
Filed April 30, 1963  4 Sheets-Sheet 1

INVENTORS
Edward J. Mellen Jr.
John M. Webb
Robert J. de Fasselle
John A. Dudek
BY McCoy, Greene, Wiedert
 + Te Grotenhuis
ATTORNEYS

Fig. 11

United States Patent Office 3,222,435
Patented Dec. 7, 1965

3,222,435
INJECTION MOLDING OF CERAMIC CORES
Edward J. Mellen, Jr., 2123 Lee Road, East Cleveland, Ohio; John M. Webb, 318 Overlook Drive, Chagrin Falls, Ohio; Robert J. de Fasselle, Timberidge Trail, Gates Mills, Ohio; and John A. Dudek, 261 E. 242nd St., Euclid, Ohio
Filed Apr. 30, 1963, Ser. No. 276,753
6 Claims. (Cl. 264—28)

The present invention relates to the manufacture of preformed ceramic mold parts and more particularly to a method of and apparatus for making improved ceramic cores and mold halves for the precision investment casting of metal parts for jet engines, rockets, valves, etc.

Heretofore, preformed ceramic cores and other ceramic mold parts have been employed in conjunction with the "lost-wax" or "frozen mercury" process to produce shell molds for the investment casting of various precision parts. Difficulty has been encountered when trying to produce ceramic cores of very thin cross section or small diameter and a large portion of the cores have been discarded as scrap. Where fine definition was required together with dimensional accuracy, it has been difficult to produce satisfactory cores even with slow and careful procedures. For these reasons the manufacture of certain types of ceramic cores has been very expensive. The number of types of ceramic cores and other ceramic mold parts which could be produced was limited due to the inability to make them in a practical manner.

It has been discovered that the above difficulties are overcome by (1) providing the ceramic slurry with a binder and an accelerator to cause the ceramic material to set in a very short period of time, (2) maintaining the slurry at a very low temperature, (3) heating the mold for the ceramic core to a high temperature, and (4) injecting the refrigerated ceramic slurry into the mold rapidly at a high pressure to fill the mold cavity before the ceramic material sets and becomes rigid. The heating of the mold preferably takes place during or after such injection.

The process of this invention reduces the amount of liquid in the ceramic slurry, minimizes air pockets in the ceramic cores, mold halves, or mold parts and improves the surface characteristics thereof. By reducing the number of defective pieces it greatly reduces the cost of certain types of ceramic mold parts having sharp corners, thin sections or special shapes. It permits mass production of ceramic cores or ceramic mold halves to close tolerances with improved quality control which is not possible with previously used methods. At the same time it reduces the need for cleaning of the molds, since the cores or other ceramic articles are firmer than those produced by the previous methods and more easily removed from the mold.

The apparatus of the invention preferably comprises a closed tank, which contains the liquid ceramic slurry and a dry gas, such as nitrogen, above the slurry; refrigerating means for the tank; means for periodically applying a high pressure to the gas in said tank; and a vertical tube extending upwardly from a point below the surface of the slurry in the tank to a nozzle at the top of the tank which discharges into a core mold mounted above the tank. The tube may be provided with cooling fins to insure rapid cooling of the slurry near the top of said tube when the injection into the mold is terminated.

An object of the present invention is to provide a practical method for making ceramic cores having thin elongated portions such as ribs, fins, small diameter rods or the like.

Another object of the invention is to increase the rate of production of special types of ceramic cores.

A further object of the invention is to provide a simple, inexpensive and reliable method for producing precision ceramic cores or mold halves having fine detail and excellent surface characteristics.

These and other objects, uses and advantages of the invention will become apparent to those skilled in the art from the following description and claims and from the drawings, in which:

Figure 1:
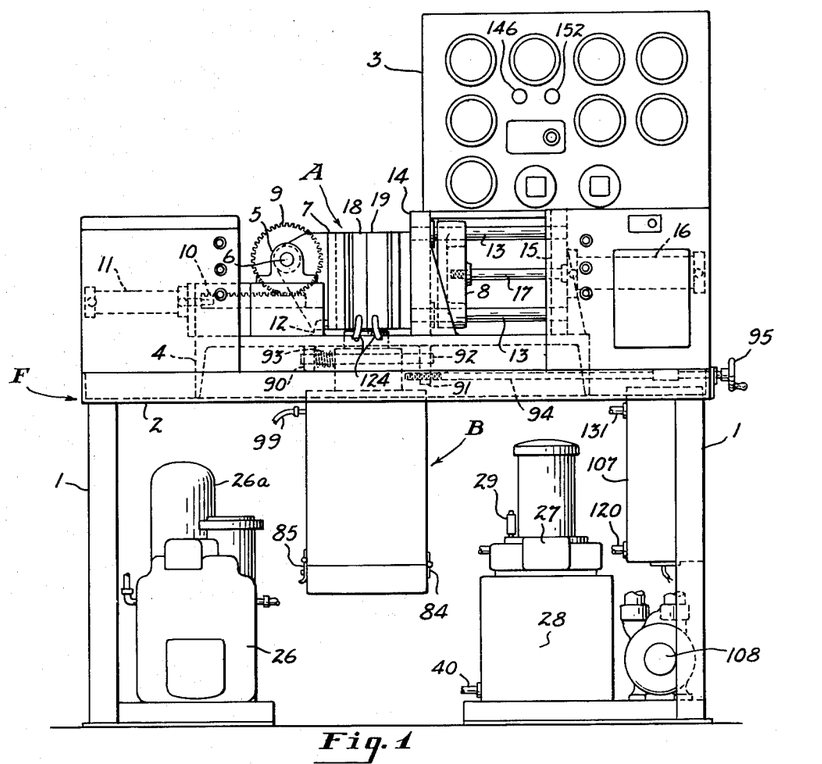
FIGURE 1 is a side elevational view on a reduced scale showing, on a reduced scale, molding apparatus constructed according to the present invention.
Figure 2:
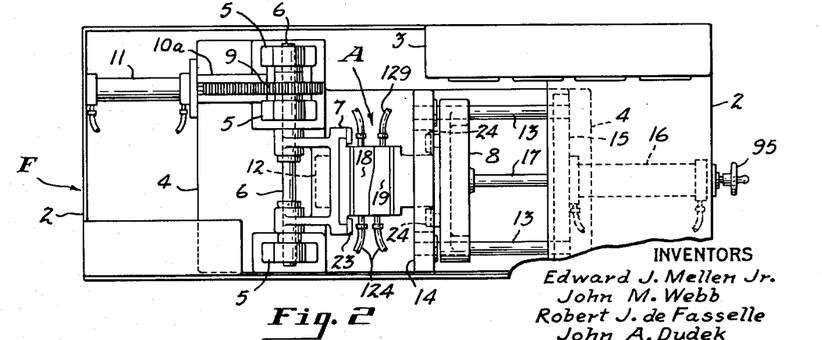
FIGURE 2 is a top plan view of the apparatus of FIGURE 1 on the same scale.

Referring more particularly to the drawings, in which like parts are identified by the same numerals throughout the several views, FIGURES 1 and 2 show a semi-automatic machine for performing the method of this invention having a rigid metal frame F with four vertical legs 1 which support a horizontal platform 2 and a vertical panel 3. A cast iron base 4 is rigidly mounted on the platform 2 of the frame F to provide a support for the die assembly A.

Figures 3, 4, 5, 6, 7:
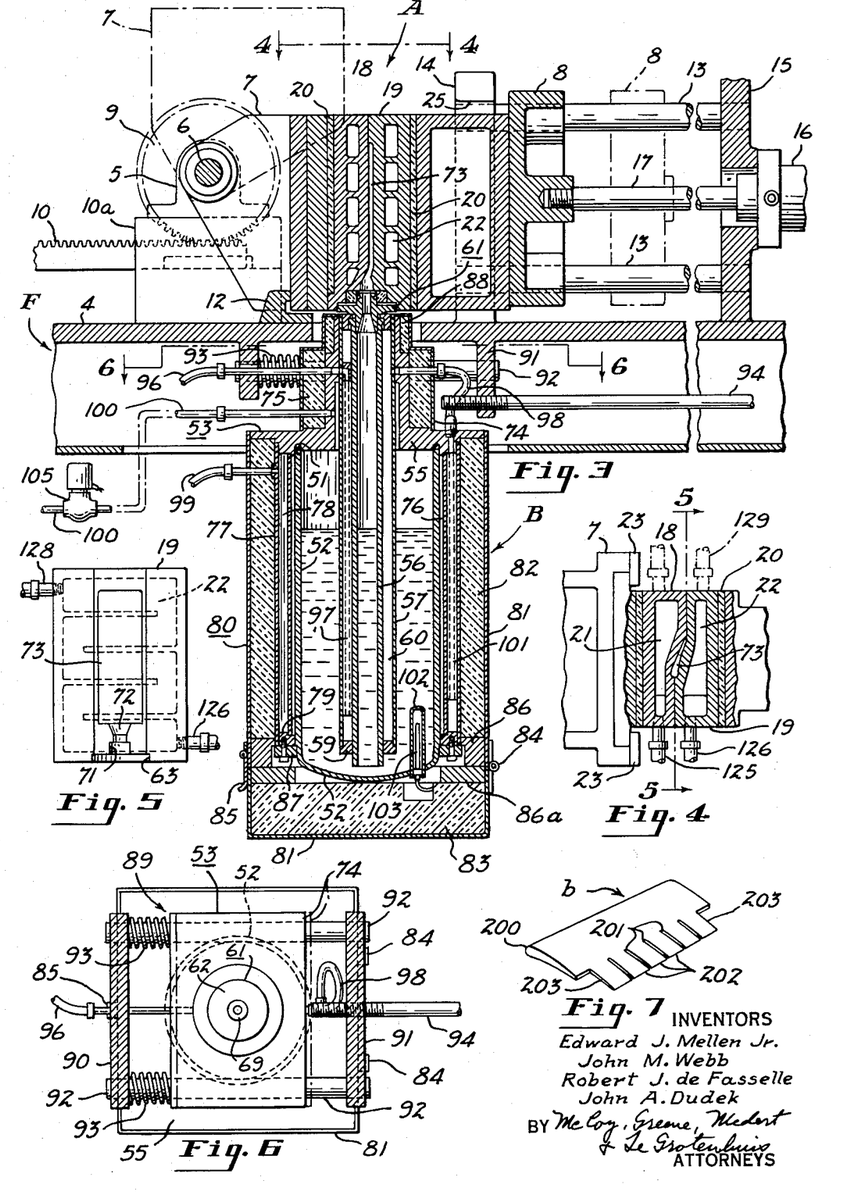
FIGURE 3 is a fragmentary longitudinal vertical sectional view showing the main elements of the apparatus on a larger scale, the parts being shown in dot-dash lines in their positions when the platens are retracted.
FIGURE 4 is a fragmentary top view with parts broken away and shown in horizontal section looking in the direction of the arrows 4—4 of FIGURE 3.
FIGURE 5 is an elevational view looking in the direction of the arrows 5—5 of FIGURE 4 showing the construction of one mold half.
FIGURE 6 is a top view looking in the direction of the arrows 6—6 of FIGURE 3, with parts broken away and shown in horizontal section.
FIGURE 7 is a perspective view on a reduced scale showing a modified form of turbine-blade core which may be made by the method of this invention.

Rigid supports are mounted on the base 4 including three pillow blocks 5 having roller bearings therein for rotatably supporting a horizontal shaft 6. Rigidly mounted on the shaft is a swivel platen 7 and a spur gear 9, whereby the platen is swung when the gear is rotated. A platen 8 is mounted above the base 4 for horizontal sliding movement toward and away from the platen 7. Both platens are hydraulically actuated to effect opening and closing of the mold halves. A rack 10 is mounted for horizontal sliding movement in a guide 10a and has teeth meshing with the teeth of the gear 9 to effect swinging of the platen 7, said rack being connected to the piston of a conventional hydraulic cylinder 11 which is rigidly mounted on the guide member 10a. The movement of the rack 10 toward the cylinder 11 moves the platen 7 from a retracted position, as shown in dot-dash lines in FIGURE 3, to an operating position as shown in solid lines in that figure. A locking member 12 is rigidly mounted on the base 4 and projects upwardly therefrom to engage the bottom portion of the platen 7, as shown in FIGURE 3, to hold said platen in its operating position with the face of the platen in a vertical position whereby the mold halves fit together properly as shown in FIGURES 2 and 4.

The sliding platen 8 has four cylindrical bores therein which receive four horizontal shafts 13 to permit horizontal sliding of the platen. These four shafts are rigidly mounted on front and rear vertical standards 14 and 15 which are rigidly mounted on the base 4, the front support 14 having a relatively large opening 25 therein to permit the die half 19 to move horizontally through said support when the platen 8 is reciprocated. A hydraulic cylinder 16 is rigidly mounted on the standard 15 and has a horizontal piston rod 17 which is connected to the platen 8 to effect movement of the platen when the piston is actuated.

Molds or dies of various types may be mounted on the platens 7 and 8 and used to perform the method of this invention, but it is usually preferred to provide molds which may be heated and cooled in a predetermined manner. As herein shown, a mold is provided having left and right die halves 18 and 19. If desired, each die half may be provided with a thin vertical layer 20 of insulating material to minimize heat transfer, but this is not always required. As herein shown, each die half is cored to provide water passage and has inlet connections for receiving heating or cooling liquid fluid, but it will be apparent that other constructions are also suitable. The mold half 18 has fluid passages 21 and the complementary mold half 19 has similar cooling passages 22. The mold sections 18 and 19 are rigidly mounted on the platens 7 and 8, respectively, by die clamps 23 and 24 or other suitable holding means.

Figure 10:
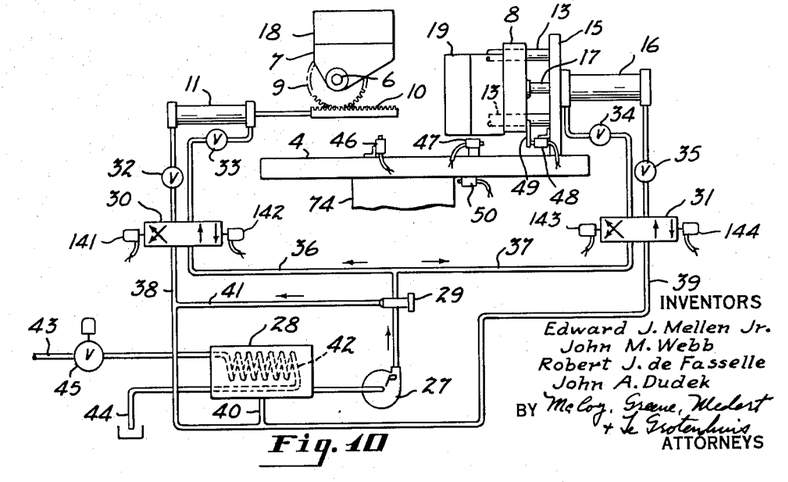
FIGURE 10 is a diagrammatic view on a reduced scale showing the hydraulic system for opening and closing the mold, the parts being shown in their positions when the die halves are retracted.

The hydraulic system for operating the platens 7 and 8 is shown schematically in FIGURE 10 and includes a motor-driven pump 27 which pumps oil from a reservoir 28 through a pressure regulator 29 and solenoid valves 30 and 31, respectively, to the cylinders 11 and 16, respectively. The valve 29 is a conventional pressure regulating valve which maintains a predetermined constant pressure in the supply lines 36 and 37, the excess fluid being directed through the by-pass line 41 back to the reservoir. Each of the solenoid valves 30 and 31 is a conventional two-way, three-position valve having one position in which the oil is directed to one side of the hydraulic cylinder to advance the piston, another position in which the oil is directed to the opposite end of the hydraulic cylinder to retract the piston, and an intermediate position which cuts off the flow of oil to the hydraulic cylinder. The two hydraulic cylinders are provided with conventional speed-control of throttling valves 32, 33, 34 and 35, which control the speed of movement of the pistons of each cylinder when the cylinder is actuated.

When oil from the supply line 37 is admitted to one end of the hydraulic cylinder 16 to move the piston, the piston forces oil out of the other end of the cylinder through the return line 39 and the inlet 40 to the reservoir, the valve 31 being constructed to permit such return flow whenever oil is admitted under pressure to either end of the cylinder 16. The valve 30 is identical to the valve 31 and permits flow through the return line 38 to the reservoir whenever oil is admitted to either end of the cylinder 11.

It is preferable to provide means for maintaining the oil temperature in the reservoir 28 below a predetermined value. As herein shown, a conventional water-oil heat exchanger 42 is provided in the reservoir. The coil of this heat exchanger receives water from a supply line 43 under the control of a conventional solenoid valve 45 and discharges the water to the drain 44. The cooling water from the line 43 removes the heat of compression and friction that the oil absorbs during operation of the machine. The solenoid of the valve 45 may be responsive to the temperature of the oil to shut off the cooling water whenever the oil temperature reaches a predetermined temperature as is well understood in the art.

Electrical means are provided for controlling the operation of the hydraulic system in accordance with the position of the platens 7 and 8. As herein shown, three limit switches 46, 47 and 48, are mounted in fixed positions on the base 4. The movable actuating element of the switch 46 is located to engage the mold half 18 as the platen 7 arrives at its operating position. The movable actuating element of the switch 47 is likewise located to engage a downwardly projecting portion 49 of the platen 8 as said platen arrives at its operating position. The actuating element of the switch 48 engages the portion 49 when the platen 8 reaches its fully retracted position.

A similar limit switch 50 is rigidly mounted on the base 4 to engage the ceramic cell when it arrives at its operating position. The purposes of the above limit switches are explained hereinafter.

A slurry cell assembly B is provided for storing refrigerated ceramic slurry and for injecting such slurry into the closed mold (18–19). This assembly includes a cup-shaped slurry cell 52 in the form of a round stainless steel vessel or tank and a bulkhead assembly 53 which closes the upper end of the slurry cell and supports the cell from the base 4 in a position below the mold as shown in FIGURE 3. The bulkhead assembly includes a generally cylindrical metal portion 54 having a vertical axis, a horizontal rectangular cover portion 55 which forms the top of the insulated box 80, and an annular insulating layer 88 surrounding portion 54.

Figure 8:
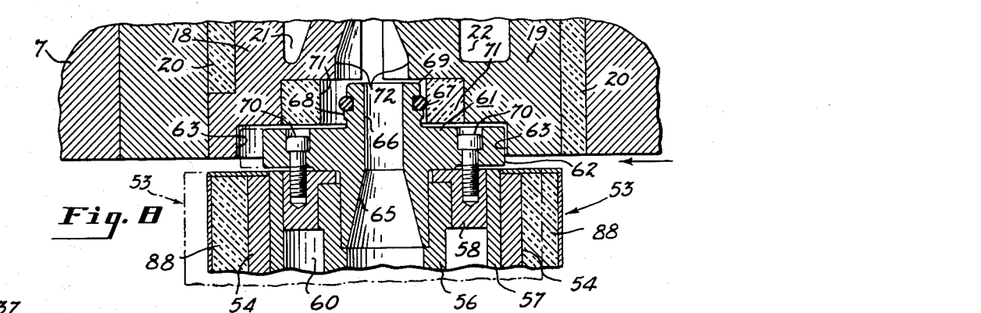
FIGURE 8 is a fragmentary vertical sectional view on a larger scale showing the construction near the top of the ceramic slurry cell.

A long central vertical tube 56 of circular cross section is mounted in the center of the cell 52 concentric thereto and is surrounded by a thin cylindrical inner jacket 57 of stainless steel having top and bottom annular closure members 58 and 59 which seal the annular space 60 between the tube 56 and the jacket 57 to provide a refrigerant chamber. A stainless steel nozzle 61 having a horizontal flange 62 is rigidly mounted on the top of the bulkhead assembly 53 coaxial with the tube 56 by means of bolts 70 which are screwed into the annular member 58. The flange 62 has an externally cylindrical surface of the same radius as the semi-cylindrical surfaces 63 of the molds 18 and 19 and is adapted to fit between the molds as shown in FIGURE 8 when the mold 8 is in a fully closed position.

The nozzle 61 projects above and below the flange 62, the downwardly projecting portion being externally cylindrical and having a frusto-conical internal surface 65. The remaining portion of the nozzle has a cylindrical internal surface 66 coaxial with the tube 56. The annular upwardly projecting portion of the nozzle has an O-ring formed of rubber or other elastomeric material mounted in an annular groove, the annular portion 68 of the nozzle below the groove having a radius slightly less than that of the semi-cylindrical internal surfaces of the insulating members 71, and the annular end portion 69 having a slightly smaller radius. Thus, when the mold is fully closed, annular clearance spaces are provided between the metal nozzle and the insulating members 71 to minimize heat transfer from the heated die halves to the nozzle. The O-ring 67 holds the nozzle out of contact with the die halves to maintain said clearance spaces while providing a tight seal between the nozzle and the mold surfaces at 71 to prevent leakage of ceramic slurry when the slurry is forced into the mold under pressure.

The bottom portions of the mold halves 18 and 19 are provided with semi-circular insulating members 71 of rectangular radial cross section which provides a cylindrical opening to receive the nozzle when the mold is fully closed. The mold halves fit togther to provide a cylindrical inetrnal surface at 71 and inlet surfaces 72 which define a passage of circular cross section coaxial with the tube 56 leading to the mold cavity 73 when the mold is fully closed as shown in FIGURES 3 and 4. As herein shown, the mold cavity is shaped to form a conventional turbine blade core, but it will be understood that various other articles may be molded using the machine shown herein.

The bulkhead assembly 53 may be provided with a thin metal shell 74 of rectangular horizontal cross section to hold the peripheral insulation 75 which surrounds the cylindrical portion 54. This insulation is employed to minimize heat flow toward the refrigerant chamber 60 and to minimize condensation on the exterior surfaces of the bulkhead assembly.

An annular outer jacket is rigidly mounted on the cover portion 55 concentric to the vessel 52 and has thin stainless steel inner and outer walls 76 which define an annular refrigerant chamber 78 similar to the chamber 60. The bottom of the chamber is closed by an annular closure member 79 which is rigidly connected to the walls 76 and 77. It will be noted that both the inner and outer jackets for the refrigerant are rigidly connected to and supported by the bulkhead assembly but that the cell 52 is removable from the cover 55. In order to support the vessel 52, a retainer ring 87 having an internal diameter slightly less than that of the vessel is bolted to the closure member 79, said closure member being welded to or otherwise being rigidly connected to and supported by the outer jacket. The ring 87 engages an annular shoulder on the vessel 52 so as to hold the flat circular upper edge of the vessel against the elastic rubber sealing ring 51 which is located in an annular groove in the flat bottom surface of the portion 55 as indicated in FIGURE 3. Thus, the vessel is clamped tightly against the sealing ring to prevent escape of nitrogen gas from the vessel when high pressure is applied to inject the slurry into the mold.

The insulated box 80 surrounds the outer jacket and slurry cell to minimize flow of heat toward the ceramic slurry stored in the cell. As herein shown, this box is externally rectangular and internally cylindrical, but it will be manifest that other shapes are also suitable. The box has a thin outer metal shell 81 having flat vertical walls and a flat bottom wall, which is swingable relative to the vertical walls by means of the hinge 84. Peripheral insulation 82 fills the space between the vertical walls and the outer jacket, and the flat bottom insulating layer 83 fills the space between the cell 52 and the bottom of the box. The outer shell 81 is welded or otherwise rigidly connected to the rectangular portion 55, whereby the box is supported by the bulkhead assembly 53.

The box is reinforced adjacent the bottom of the slurry cell by two externally rectangular rings 86 and 86a, which are rigidly attached to the two halves of the hinge 84. The ring 86a thus reinforces the access door below the ring 86, and the ring 86 reinforces the box while engaging the outer jacket wall 77 throughout its periphery to position the box and the jacket relative to each other. The access door is held in a closed position, as shown in FIGURE 3, by the latch 85, which may be released to open the door and to permit removal of the ring 87 and the slurry cell 52 when it is desired to clean the cell.

A bulb well 102 is mounted on the bottom of the cell 52 to provide a receptacle for the thermostatic sensing element 103.

Various conventional refrigeration systems are suitable for use in maintaining a predetermined low temperature in the slurry cell 52. As shown in FIGURE 1, a compressor 26 and a condensor 26a of a conventional refrigeration system are mounted on the floor adjacent the frame F. Suitable controls (not shown) may be provided, which are responsive to the thermostatic sensing element 103, to maintain a predetermined low temperature (i.e., —50° F.) in the slurry cell as is well understood in the refrigeration art. The refrigerant is preferably a liquefied gas having a low boiling point, such as difluorodichloromethane, monochlorodifluoromethane or the like.

The refrigerant is fed through the inner and outer jackets of the slurry cell assembly B to maintain a predetermined low temperature in the slurry cell 52, which may be as low as —75° F. The refrigerant flows through the supply line 96 to a vertical dip tube 97 which extends from a point near the top of the refrigerant chamber 60 to a point near the bottom of said chamber. The refrigerant then flows from the bottom of said chamber of the flexible connecting line 98 which communicates with the upper end of the chamber, said connecting line being connected to a second dip tube 101 which carries the refrigerant from the top to the bottom of the refrigerant chamber 78. The refrigerant then flows from the bottom of the latter chamber to the flexible outlet line 99 which communicates with the top of said chamber as shown in FIGURE 3. As herein shown, the inner and outer refrigerant chambers 60 and 78 are connected in series, but it will be understood that other arrangements are also suitable provided that the refrigerant entering the bottom of the inner chamber 60 has the desired low temperature.

The refrigerant chamber 60 functions to cool the entire tube 56 including the ceramic slurry at the top of the tube 56. This prevents the slurry from setting up at the top of the tube 56 at the end of the mold heating period and during the period prior to the next injection. If desired, the tube 56 may be provided with external ribs or fins to increase the rate of heat transfer.

The refrigerated ceramic slurry in the cell 52 is forced upwardly through the tube 56 into the mold cavity by the pressure of the dry gas, such as nitrogen, which is fed into the top of the slurry cell through the gas supply line 100. Since the tube 56 is not provided with a control valve in the apparatus shown, the flow from the gas pressure source is controlled by a conventional solenoid valve 105 located in the line 100 as shown schematically in FIGURE 3. The valve 105 may be omitted when a solenoid valve is provided in the tube 56 to open and close the tube. The machine shown in the drawings is constructed to have substantial versatility. In order to permit the use of molds or dies of different sizes, it is preferable to adjust the relative positions of the slurry cell and the platens 7 and 8. It is preferable to adjust the slurry cell in a horizontal direction toward and away from the shaft 6. As herein shown, the assembly B is mounted on horizontal shafts below the base 4 for movement in a direction parallel to the horizontal shaft 17. The carriage 89 is mounted on two horizontal shafts 92 which are rigidly supported with their axes in the same horizontal plane by two vertical lugs 90 and 91, as best shown in FIGURES 3 and 6. This figure views the top of the bulkhead assembly, the lugs 90 and 91 being shown in horizontal section and the parts above the bulkhead assembly being omitted.

A spring 93 is mounted on each shaft 92 between the lug 90 and the shell 74 to bias the bulkhead assembly in a direction toward the lug 91. The movement in this direction is limited by a long horizontal adjusting rod 94, which is supported by the lug 91 and the frame F for rotation about a horizontal axis. The rod has threads at one end, which screws into the lug 91, and has a handle 95 at the opposite end which may be turned manually to adjust the position of the end of the rod which engages the shell 74. It is thus possible to adjust the operating position of the nozzle 61 so that it will fit molds (or dies) of different sizes without changing the position of the shaft 6.

Since the assembly B is free to move horizontally when engaged by either of the die halves 18 and 19, the nozzle does not interfere with closing of the mold (18–19) even when the position of the assembly B is not accurately adjusted by the handle 95. It is thus very easy to make the adjustments necessary to permit changing from one size mold to another. The lines 96, 98, 99 and 100 are flexible so as not to interfere with the horizontal movement of the slurry cell assembly. It will be noted that the inlet line at 96 which extends through the insulation 75 is parallel to the shafts 92 and is free to move through the lug 90 without interfering with horizontal movement of the carriage 89.

The springs 93 normally hold the bulkhead assembly against the end of the rod 94 so that the nozzle 61 is out of contact with the mold half 18 and cannot interfere with swinging movement of the platen 7. When the platen 7 is swung from the retracted position, shown in dot-dash lines in FIGURE 3 wherein the parting face of the mold half 18 is in a horizontal position, to the operating position shown in solid lines in FIGURE 3, wherein the platen is supported by the lock 12 and the nozzle 61 is spaced a short distance (for example, less than one inch) from the semi-cyclindrical surfaces 63 and 71 of the mold half 18 as shown in FIGURE 8.

The closing movement of the platen 8 is timed so that the final closing movement of the die half 19 occurs after the die half 18 has reached its vertical operating position. During this final closing movement, the semicylindrical surface 63 of the die half 19 engages the flange 62 as shown in FIGURE 8 and carries the nozzle 61 and the bulkhead assembly 53 from the positio nshown in solid lines in FIGURE 8 to the position shown in dot-dash lines in the figure. When the mold halves are closed, as shown in FIGURES 3 and 4, the surfaces 63 and 71 engage the nozzle and the O-ring 67 throughout the periphery of the nozzle.

When the ceramic material has been injected and has set, the mold is opened by first retracting the platen 8, the springs 93 causing the nozzle 61 to move away from the mold half 18 just before the platen 7 is retracted, whereby there is no frictional contact between the nozzle and the mold during swinging of the platen which could interfere with such swinging or cause excessive wear.

Figure 9:
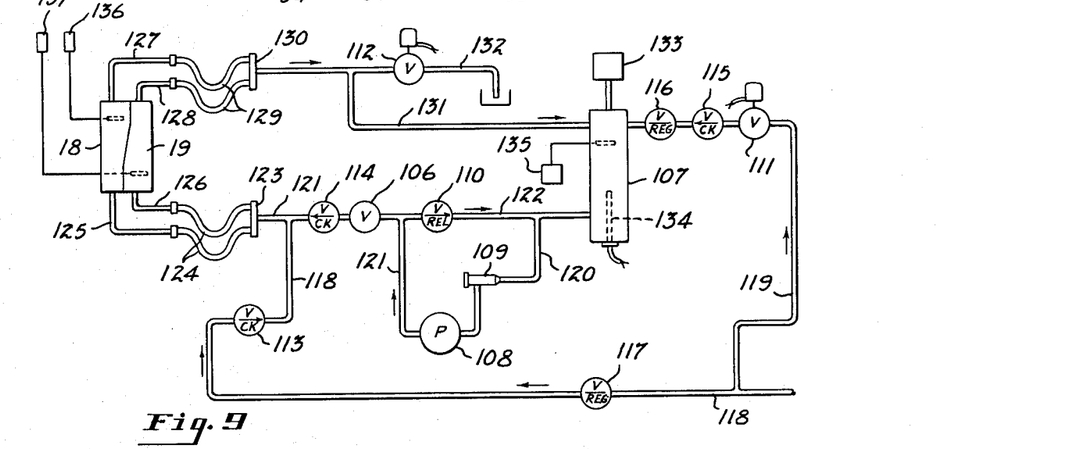
FIGURE 9 is a diagrammatic view on a reduced scale showing the heating and cooling system for the mold.

When molding certain parts, such as long rods having very small diameter (for example, a diameter of .05 inch) or parts having complicated shapes, fine detail, thin sections and the like, it is often necessary to prevent the ceremic slurry from setting up too quickly, and it is desirable to provide a mold which is cored to provide passages for flow of heating or cooling fluid, such as water or steam. FIGURE 9 shows schematically a suitable heating and cooling system which may be employed with the machine of FIGURES 1 to 8. This includes an insulated water heater 107 and a motor-driven water pump 108 which may be located on the frame F as shown in FIGURE 1. The system also includes a water filter 109, a pump-pressure of relief valve or by-pass valve 110, a heating solenoid valve 111, a cooling solenoid valve 112, check valves 113, 114 and 115, and regulating valves 116 and 117. These valves are all of the conventional type and need not be described in detail. The supply of hot and cold water is controlled primarily by the valves 111 and 112, which are moved by their solenoids to an open or closed position.

Cold tap water, chilled water or other cooling liquid is supplied from a supply line 118. When the valve 111 is closed and the valve 112 is opened to permit flow of tap water through the mold halves 18 and 19, the water from the line 118 flows through the pressure regulating valve 117 which maintains a low pressure on the downstream side of the valve. The water then flows through the check valve 113 to the inlet header 123 which is connected by flexible hoses 124 to the inlets 125 and 126 of the mold. The water flows through the cooling passages 22 and 23 of the mold halves to the outlets 127 and 128, respectively, and through the flexible hoses 129 to the outlet header 130. Since the valve 112 is open at this time, the water flows out of the system through the drain line 132.

When it is desired to switch from cooling to heating, the automatic electrical controls cause the valve 112 to close and the valve 111 to open, while at the same time starting the motor 150 driving the pump 108. The tap water from the supply line 118 then flows through the make-up line 119 through the valve 111 and the one-way check valve 115 to the pressure regulating valve 116, which restricts the flow and maintains a low pressure at the downstream side of the valve. The amount of water flowing into the water heater 107 is thus no more than that required to maintain the hot water level. The pump 108 draws the hot water through the hot-water supply line 120 and the filter 109 and pumps it through the supply line 121, the conventional throttling valve 106, and the one-way check valve 114 to the inlet header 123. The water then flows from the inlet header through the mold to the outlet header 130 and through the hot water return line 131 to the heater 107, the flow to the drain being prevented by the closed valve 12.

An expansion tank 133 is provided to prevent excessive hydrostatic pressure when the water is heated, and suitable vent or relief valves are also provided for safety purposes. The pressure relief valve 110 by-passes water through the by-pass line 122 to prevent any damage to the system by excessive pump pressures.

Means may be provided to maintain any desired hot water temperature. It is usually preferable to maintain the hot water at a temperature of 200 to 250° F., but it will be understood that steam heating may also be employed in that practice of this invention. As herein shown, a water thermostat 135 is provided which controls the heating element 134 of the heater to maintain a predetermined water temperature. Thermoswitches 136 and 137 are provided in the mold halves 18 and 19, respectively. These are part of the electrical system which is described hereinafter.

The method of this invention permits mass production of turbine blade cores, U-shaped rods, long rods of small diameter and various other articles which heretofore could not be made satisfactorily. It is possible to make a simple turbine blade core and also more complicated cores having very thin sections. FIGURE 7 shows such a core $b$ having a thin trailing edge portion 203 and a relatively thick leading portion 200 with a straight leading surface of the usual curved cross section. The trailing portion has straight sides 203 spaced inwardly from the ends of the core $b$ and a series of parallel slots 201 which form metal reinforcing ribs in the finished turbine blade. The trailing edge of the core is thus divided into space portions 202. The slots 201 may be sawed or otherwise formed. The core $b$ must be of the highest possible quality so that the thin portions will not break and so that necessary dimensional accuracy is maintained. Articles of this type are easily mass produced employing the process of this invention.

The process of the present invention can be performed manually at a high rate of speed to effect economical mass production of ceramic cores or ceramic mold halves, but cores can be made faster with a lower percentage of defective pieces using semi-automatic equipment. The apparatus shown in FIGURES 1 to 10, for example, may be controlled manually by an operator watching the gages on the panel 3, but it is preferable to provide electrical controls to cause automatic or semi-automatic operation of such apparatus.

Figure 11:
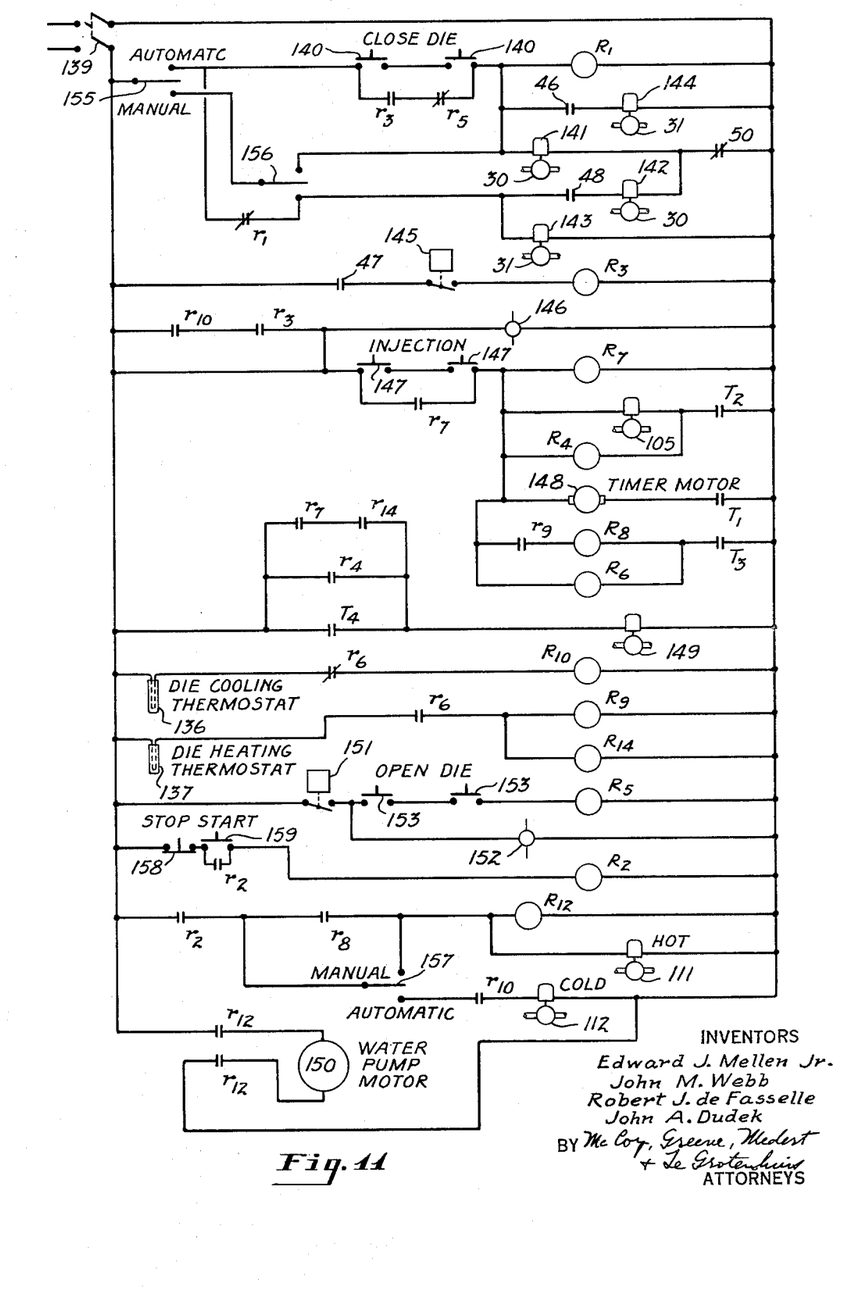
FIGURE 11 is an electrical diagram showing the electrical equipment used with the apparatus of FIGURES 1 to 6 and 8 to 10.

FIGURE 11 is a diagrammatic view of suitable electrical control equipment, it being understood that additional conventional electrical devices may also be employed for other purposes which are not necessary for an understanding of the invention. When it is desired to start production of ceramic cores or other ceramic mold parts, the switch 139 is closed, the motor (not shown) driving the hydraulic pump 27 is started, and the solenoid valve 45 is opened to allow cooling tap water to flow through the heat exchanger 42. At this time the hot water heating element 134 is in operation, the refrigerant compressor 26 is in operation, the refrigerant is fed through the inner and outer jackets of the ceramic cell, the thermostat 103 is set to maintain the slurry at a predetermined low temperature (which is usually —40° F. to —50° F.), and the hot water thermostat 135 is set to maintain a predetermined water temperature which is preferably 200° to 250° F. The thermostat may, however, be set to maintain such temperature at 80° to 200° F. A fixed water temperature is desirable to provide the mold with a predetermined temperature, whereby uniform results are obtained.

With the electrical equipment shown herein, the operation is semi-automatic in that the operator has to actuate push buttons (140, 147 and 153) for three basic operations which then are automatically executed. These operations are (a) closing the die or mold (b) injecting the slurry into the die cavity, and (c) opening the die. It will be manifest, however, that these steps may all be performed automatically. After the die is opened, however, the operator is usually needed to inspect the finished pattern or core and to remove the core from the die half 18.

The electrical equipment of FIGURE 11 is set for semi-automatic operation by placing the switch 155 in its uppermost position and placing the switch 157 in its lowermost position. When the switch 155 is in its lowermost (manual) position, the switches 155, 156, 158 and 159 may be used for manual control of the equipment.

Operation is initiated by depressing the start button 159 and the two horizontally spaced push buttons 140 after the switch 155 has been moved to the upper "automatic" position. This is a safety measure to make sure that both hands are on the buttons 140 until the die is closed. As soon as the relay $R_1$ is energized, it opens the normally-closed switch $r_1$ in the line supplying the solenoids for the valves 142 and 143 so as to lock out these solenoids. The current passing through the two buttons 140 energizes the solenoid 141 of the valve 30 to admit hydraulic fluid to the piston end of the cylinder 11, thereby swinging the platen 7 clockwise to its operating position. As the mold half 18 moves against the stop 12 to its vertical operating position, it trips and closes the limit switch 46 to energize the solenoid 144 of the hydraulic valve 31, thereby admitting fluid under pressure to the right end of the cylinder 16 and initiating closing movement of the platen 8. The die half 19 engages the nozzle 61 as shown in FIGURE 8 and moves the carriage 89 and the slurry cell 52 one-half inch or so during the final closing movement.

If the die half 19 is not properly seated the normally-open limit switch 47 prevents subsequent energization of the relay $R_3$. When the die is properly closed the actuator 49 trips the switch 47 and closes it.

Since the hydraulic fluid continues to be pumped to the cylinder 16 after movement of the platen 8 has stopped, there is an increase in hydraulic pressure. A normally-open switch 145 responsive to this pressure is closed when the pressure reaches a predetermined amount to energize the relay $R_3$, thereby closing the normally-open switches $r_3$. Current is then supplied to the relay $R_1$ through the switches $r_3$ and $r_5$ so that the operator may release the two buttons 140.

Since the normally-closed switch $r_6$ energizes the relay $R_{10}$ at this time, the closed (normally-open) switches $r_3$ and $r_{10}$ supply current to the ready light 146 upon energization of the relay $R_3$, thereby signalling that the equipment is ready for injection. In response to this signal, the injection may be started automatically but it is preferably started manually. The operator uses both hands to close the two push buttons 147 and to energize the relay $R_7$ which immediately closes the normally-open switch $r_7$. This completes the circuit through the switch $r_7$ and the relay $R_7$ so that the operator need not continue to hold the buttons 147.

The closing of the switch $r_7$ energizes the timer motor 148 for the timers $T_1$, $T_2$, $T_3$ and $T_4$. The timer motor is held in by the timer contact $T_1$ which is closed almost immediately. The timer $T_2$ also closes almost immediately to energize the solenoid of the gas-pressure valve 105 and thereby admit pressurized dry gas through the line 100 to the top of the slurry cell 52. The gas pressure, which may be more than 100 pounds per square inch gage, forces the refrigerated ceramic slurry up through the nozzle 61 into the die cavity 73 to fill the cavity rapidly.

The die temperature and time for filling the die will vary according to the type of article being molded. The timer $T_2$ is set to open after a predetermined time (when the die is filled) to deenergize the solenoid of the valve 105 thereby effecting closing of the valve and discontinuing feed of the ceramic slurry. It will be noted that timer $T_2$ energizes relay $R_4$ to close normally-open switch $r_4$ and to energize the solenoid of the vent valve 149 whereby said valve is closed and cannot vent the slurry cell 52.

The start button 159 is preferably pushed at the beginning of a cycle but this is not essential. It must be pushed, however, to effect starting of the water pump motor 150 or to obtain automatic heating and cooling of the die. When the button 159 is closed to energize the relay $R_2$ the normally-open switch $r_2$ of the holding circuit immediately closes to bypass said button so that said relay remains energized when the button is released. Closing of the normally-open switch $r_2$ in series with the switch $r_8$ closes line leading to the relay $R_{12}$ so that the pump motor 150 may be started manually or automatically depending in the position of the switch 157.

When the timer $T_2$ opens to stop the injection of slurry, the timer $T_3$ immediately closes to energize the relay $R_6$ and to close the normally-open switches $r_6$. This energizes the relays $R_9$ and $R_{14}$ to open or close the switches $r_9$ and $r_{14}$. The normally-closed switch $r_6$ is opened to deenergize the relay $R_{10}$ and to return the switches $r_{10}$ to their normal positions, whereby the ready light 146 goes out and the solenoid of the cold water valve 112 is deenergized to cut off flow of cold water through said valve. Since $r_9$ and $T_3$ are both closed, the relay $R_8$ is energized to close the normally-open switch $r_8$, thereby energizing the relay $R_{12}$ and the solenoid of the hot water valve 111. This initiates flow of hot water through said valve 111 and closes the normally-open switches $r_{12}$ to start the motor 150 which drives the water pump 108.

Thus, the hot water is fed to the fluid passages 22 and 23 of the die halves a predetermined period of time after the injection of the slurry is initiated and preferably after the die cavity is filled with ceramic slurry. This speeds up the setting of the ceramic material.

It is preferable to cut off the flow of heating fluid after the die is heated to a fixed temperature. This is accomplished by the heating thermostat 137 which opens at a predetermined temperature to deenergize the relays $R_9$ and $R_{14}$ to return the switches $r_9$ and $r_{14}$ to their normal open positions, to deenergize the relay $R_8$, and to return the switch $r_8$ to its open position, thereby shutting off the pump motor 150 and the hot water valve 111.

Before the die can be opened, it is necessary to reduce the gas pressure in the slurry cell 52, for example, by venting to atmospheric pressure. This venting is carried out when the vent valve 149 is opened by deenergizing its solenoid. It will be noted that the switches $r_4$ and $r_{14}$ and the timer $T_4$ are connected in parallel so that all three must be open to deenergize the solenoid of the vent valve. The normally-open switch $r_4$ is open when replay $R_4$ is deenergized by timer $T_2$ at the end of the slurry injection, and the switch $r_{14}$ is open when the relay $R_{14}$ is deenergized by thermostat 137. The timer $T_4$ is thus the last to open and provides means for controlling the "setting time" for the heated ceramic material in the mold cavity. After a predetermined setting time the timer $T_4$ opens to deenergize the solenoid of valve 149 and to effect venting of the slurry cell 52. As soon as the pressure has been reduced, the operator presses the two push buttons 153 to energize the relay $R_5$ and to initiate opening of the die.

It is preferable to provide means to warn the operator or delay the energizing of the relay $R_5$ in the event the pressure has not been reduced sufficiently in the slurry cell. As herein shown, a normally-open pressure switch 151 is connected in series with a ready light 152 and closes when the gas rpessure in the slurry cell 52 falls below a predetermined safe amount. This energizes said light and signals the operator that the mold (18–19) is ready to be opened. In response to this signal the operator pushes both buttons 153 to energize the relay $R_5$, thereby opening the normally-closed switch $r_5$ to de-energize the relay $R_1$ and the solenoid 141. The normally-closed switch $r_1$ in series with the solenoid 143 then effects operation of the hydraulic valve 31 to supply fluid under pressure to the left end of the cylinder 16, thereby retracting the platen 8. When the die is open and the platen 8 is fully retracted, the member 49 trips and closes the limit switch 48 to energize the solenoid 142 of the hydraulic valve 30 and thereby initiate opening movement of the swivel platen 7 by the cylinder 11.

The safety switch 50 is closed at this time since the springs 93 have moved the slurry cell carriage 89 to the retracted position shown in solid lines in FIGURE 8 where the nozzle 61 cannot interfere with swinging movement of the die half 18. The switch 50 is opened when the slurry cell is in its operating position and the mold is closed and remains in the open position until the mold is opened and the nozzle 61 is out of the path of movement of the swinging die 18.

During the final opening movement, the platen 7 swings the mold half 18 to the uppermost horizontal position shown in FIGURE 10. The finished core or pattern has less tendency to stick to the die half 19 and remains on the die half 18. The unit is ready for another cycle of operations as soon as the finished core is removed, and this cycle is initiated by pushing the buttons 140 as before.

It is usually necessary to have an operator remove the finished patterns from the machine, but it will be apparent that fully automatic operation is possible. The ready lights 146 and 152, for example, could be replaced with relays and associated switches to initiate automatic closing of the switches 147 and 153, respectively.

If manual operation is desired the switch 155 is moved to its lower "manual" position, and the hydraulic valves 30 and 31 are controlled manually by the switch 156.

In performing the process of this invention, a ceramic slurry may be employed comprising finely divided refractory particles, a binder, a liquid vehicle, and an accelerator. The binder or hardener which bonds the refractory particles together may be colloidal silica or other conventional binder as disclosed in U.S. Patent No. 2,932,864 but it is preferably ethyl silicate which deposits silica upon drying from an alcoholic solution. The ingredients employed in the slurry may be conventional.

The setting of a ceramic slurry in a mold may be accelerated by controlling the pH. The accelerators increase or decrease the pH to harden the ceramic material more rapidly. In an ethyl silicate system, for example, a mixture of water and ammonium acetate provides an effective accelerator. In other systems an acidic material such as hydrochloric acid, rather than an alkaline material, might be used as an accelerator, but systems requiring an alkaline accelerator are most common.

Ethyl silicate is one of the most commonly used binders, and the manner of using this material in ceramic slurries is well understood in the investment casting art as disclosed for example in U.S. Patent No. 2,818,619 and U.S. Patent No. 2,948,935. As pointed out in the above patents, the ceramic slurry comprises a dry mix to which the ethyl silicate binder is added, said dry mix consisting essentially of finely divided refractory material, such as fused silica or zirconium silicate, and a very small proportion of an accelerator or gelation agent for the binder, such as an alkaline oxide or carbonate. Magnesium oxide is the setting catalyst preferably employed.

The ethyl silicate type of binder used in the process of this invention usually comprises, by weight, about 30 to 60 percent ethyl silicate, about 30 to 60 percent alcohol, about 0.05 to 0.5 percent concentrated hydrochloric acid and about 1 to 10 percent water. One part by weight of such binder is preferably mixed with about 2.5 to 4.5 parts by weight of the dry refractory material or dry mix. When the above investment dry mix and the binder are mixed the resultant ceramic slurry may, for example, comprise about 50 to 90 percent of finely divided refractory material (which may include 20 or 25 percent silica flour), about 0.05 to 1.5 perecent magnesium oxide, about 5 to 20 percent condensed ethyl silicate, about 5 to 20 percent alcohol, about 0.01 to 0.1 percent hydrochloric acid, and about 0.5 to 4 percent water. It will be understood, however, that the proportions of ingredients may vary considerably.

In the practice of this invention various hydrolyzed solutions of ethyl silicate may be employed as disclosed, for example, in the publication "Some Observations on Investment Casting Processes with Ethyl Silicate Binder Solutions" printed in December 1957, by Union Carbide & Chemical Company.

The ethyl silicate type of binder may employ catalysts such as magnesium oxide, aluminum oxide. The ceramic slurry used in the process of this invention may also contain high temperature binders such as magnesium fluoride, boric acid, aluminum oxide, phosphate groups or the like. Various chemicals or combinations of chemicals may be employed to cause a neutral or slightly alkaline reaction to accelerate the gelling of the mix. Suitable accelerators of this type include ammonium hydroxide, ammonium carbonate, ammonium acetate, morpholine and the like.

The rate of gel can be varied by varying the amount of the accelerator.

Various refractories may be employed in the ceramic slurry including most of the refractory oxides such as aluminum oxide and oxides of zirconium, magnesium, beryllium or titanium. Zirconium or aluminum silicates may also be used. An excellent choice is a mixture of 60 percent fused silica and 40 percent zirconium silicate (zirconite). The refractories preferably have sufficient fineness so that at least 60 percent will pass through a standard 100-mesh screen. A substantial amount of the refractory may be in the form of a flour which will pass through a 200-mesh screen.

The ceramic slurry may contain various refractory materials or refractory binders, including organic binders such as polyvinyl butyrate, that give better green strength and sintering strength as is well understood in the art.

It will be understood that the ceramic slurry used in the practice of this invention should be compounded in accordance with the shape, size and other desired characteristics of the core or other pattern being made in the mold. Thus, the particle size of the refractory, the type of refractory, the type of binder, the type of accelerator, and the amount of accelerator may vary considerably in the ceramic slurry, and the temperatures, pressures and molding times will also vary depending on the type of pattern being made.

When making patterns, such as turbine-blade cores, which are to be used in forming metal parts it is necessary in the practice of this invention to employ a high temperature binder which is effective in binding the refractory particles together at very high temperatures ranging from about 300° C. to about 1300° C., and which holds the particles together up to the temperature (i.e., 1650° C., or higher) at which the molten metal is cast in the mold. Such high temperature binders are conventional and form no part of this invention.

A typical example of the process is given below to facilitate an understanding of the invention.

To provide a carrier which is liquid at low temperature, 5300 milliliters of ethyl silicate 40 are mixed with 4200 milliliters of ethyl alcohol and 500 milliliters of one percent hydrochloric acid. One part by weight of the resulting liquid carrier is then added to a large mixing machine together with three parts by weight of a conventional dry mix consisting of 60 percent by weight of used silica, 39.5 percent zirconium silicate, and 0.5 percent magnesium oxide, which has previously been prepared in a ball mill. The zirconium silicate is in the form of a powder which will pass through a 200-mesh (U.S. Standard Sieve) screen. The fused silica comprises 40 percent by weight of coarse particles with a 60-mesh to 100-mesh particle size and 60 percent by weight of finer particles with a 100-mesh to 300-mesh particle size.

In order to provide an accelerator for the ceramic slurry, 10 milliliters of a 25 percent solution of ammonium acetate in water are added per 1000 milliliters of said liquid carrier in said mixing machine.

After the carrier, the refractory material, and said accelerator have been thoroughly mixed for several minutes at a temperature of —40° to —30° F. to provide a conventional ceramic slurry, the slurry is placed in the ceramic cell 52 of the apparatus shown in FIGURES 1 to 6. The temperature of the slurry in the cell is maintained at —50° F. during operation of the molding machine and is reduced to —60° F. when the machine is shut down to permit storing of the slurry.

As soon as a sufficient amount of slurry has been mixed and placed in the ceramic cell 52, several ceramic cores are made by the same procedure as described below. In each cycle of operations the buttons 140 are pressed to move the die halves 18 and 19 together and close the die. When the ready light 146 goes on, the buttons 147 are pushed to admit the nitrogen gas to the slurry cell at a pressure of about 250 pounds per square inch gage, the dies being held closed against this pressure when the slurry fills the die cavity. Two seconds after the valve 105 is opened to admit the high pressure to the slurry, the mold (18–19), which is then at a temperature of 60° F., is supplied with hot water from the water heater 107, whose temperature is maintained at 250° F., to heat the mold rapidly to a temperature of 130° F. When the temperature reaches the latter amount, the supply of hot water is discontinued. About one minute after the slurry is injected into the mold cavity and after it has set to the rigid state, the pressure in the ceramic cell is reduced to atmospheric pressure and the buttons 153 are pushed to open the die. Since the die cavity of the mold half 19 is lubricated with graphite, the finished turbine-blade core sticks to the mold half 18 and is carried to a horizontal position when the platen 7 is retracted.

Ceramic cores made in this manner are free of cracks and surface defects, have excellent surface finish, excellent detail, sharp corners, and excellent strength and dimensional accuracy. The process minimizes the amount of scrap due to defective or broken patterns, speeds up production materially, and makes it possible to hold exceptionally close tolerances. The ceramic cores can usually be made at a rate of 12 to 15 or more per hour per operator which is several times the rate of production prior to this invention. The molds do not have to be cleaned as frequently when employing the process of this invention.

In the above example, the ratio, by weight, of said dry mix and said liquid carrier may vary from 2.5:1 to 4.0:1 depending on the type of core being made. The accelerator (25 percent ammonium acetate in water) can vary from 1 to 30 milliliters per 1000 milliliters of the liquid carrier (hydrolyzed ethyl silicate), and the water can vary from 2 to 20 milliliters per 1000 milliliters of said carrier.

The term "ethyl silicate" is used herein to cover compounds such as tetraethyl orthosilicate and "condensed ethyl silicate" which are known commercially under the generalized description ethyl silicate.

Various means may be employed to cause the core or pattern to stick only to the die half 18 when the die is opened. It is preferable to accomplish this by lubricating the die cavity of the mold half 19 with a suitable soap, graphite or silicone lubricant, but other methods may also be employed. Thus the die half 18 could be provided with a rougher surface than the half 19 or the die halves could be maintained at different temperatures to cause the core to stick to the die half 18.

The process of the present invention is preferably performed using a ceramic slurry containing a major portion of finely divided refractory particles, a minor portion of an ethyl silicate binder solution, and a setting accelerator for the ethyl silicate, which slurry will set or harden in 5 seconds to 5 minutes at 25° C. This slurry is prepared rapidly at a low temperature (for example, —50° to 0° C.) in the presence of a dry gas, such as dry nitrogen, and is stored up to 10 days (for example, 5 to 10 days) at a temperature not in excess of 0° C. and preferably —20° to —75° C., the maximum storage time being greater when the temperature is lower and vice versa. The slurry is stored in the presence of a dry gas which is substantially free of water and carbon dioxide, the dew point preferably being not in excess of —40° C. The gas is preferably an inert gas or a gas which will not support combustion such as nitrogen.

An insulated slurry cell, such as the cell 52, is preferably provided to store the slurry and to supply the slurry to the mold cavity. The process also employs a vertical tube, such as the tube 56, in the cell and a dry gas in the top of the cell to force the ceramic slurry up the tube into a mold cavity above the cell.

A nitrogen gas pressure up to 1,200 pounds per square inch or even higher (i.e., 2000 p.s.i.) may be employed to effect rapid feeding of the slurry, but the pressure is preferably about 50 to 600 pounds per square inch or sufficient to fill the mold cavity in 1 to 5 seconds. The amount of pressure required and the maximum time for filling the mold cavity will depend on the size and shape of the core. In general, cores having thin sections require more pressure and a higher feed rate than thick cores. Likewise, faster injection rates are necessary when large amounts of accelerator are employed to minimize the setting time.

When the core has a very small diameter or very thin sections, it is desirable to cool the mold cavity before injecting the ceramic material. In such a case cooling water may be passed through the mold to reduce the temperature of the mold cavity to 0° to 30° C. before injection of the ceramic slurry is initiated.

If means are provided for rapidly heating the mold cavity it is usually preferable to maintain the temperature of the mold cavity between 0° C. and 40° C. immediately prior to injection of the ceramic slurry and to heat the cavity to a temperature of 40° C. to 150° C. after the injection is initiated. The time required to fill the mold cavity is usually about ½ to 3 seconds, and the heating of the mold is preferably initiated 1 to 3 seconds after the injection is initiated.

The mold is held tightly closed from the time the injection is initiated until the ceramic material has set, and the pressure applied by the inert gas to the slurry in the mold cavity is preferably maintained ½ to 3 minutes until the ceramic material sets and becomes firm. After the pattern has become sufficiently firm, the pressure is released and the mold is opened. Further heat may be used for further cure if necessary. The time from the initiation of injection to the opening of the mold is usually 1 to 4 minutes but may be much less.

After the horizontal platen 8 has been retracted to separate the die half 19 from the finished core or pattern and the swivel platen 7 has retracted the die half 18 to its uppermost horizontal position, the pattern in the die cavity may be inspected before being removed.

It will be understood that the ceramic slurry used in the above example may be stored in the slurry cell 52 for many days at —60° F. before the molding operations are performed and that the total amount of heating of the ceramic article may be increased if it is desired to provide greater firmness. In general the amount of heating necessary depends on the size and shape of the ceramic core or mold half being produced.

After the core has been removed from the die and the manufacture of the core has been completed, a wax pattern may be applied and a shell mold formed around the wax in accordance with the well known "lost-wax" process as disclosed for example in U.S. Patent No. 2,932,864 or U.S. application Serial No. 143,266, filed Sept. 12, 1961. The wax pattern has the same shape as the article to be formed and is melted out of the finished shell mold to provide the cavity for receiving the molten metal. After the metal is poured and the desired article is cast in the shell mold, the ceramic shell mold is broken and the ceramic core is removed leaving a cavity in the finished metal article having the same shape as the ceramic core. Thus, the core $b$ of the FIGURE 7 provides the turbine blade with small air cooling passages which discharge through the trailing edge of the blade and ribs (corresponding to slots 201) for reinforcing the blade in the vicinity of said passages.

Heretofore it has been difficult to form cores such as the core $b$ having very thin cross section and a large number of defective cores have been made and rejected as scrap. Cracking was particularly serious problem and it was difficult to provide good surface characteristics and also adequate strength. The process of this invention solves this problem and makes it easy to mass produce cores having high density and thin cross section.

The feeding of ceramic material into molds to form ceramic cores for investment molding of turbine blades and other metal parts has heretofore been difficult because of the tendency of the ceramic material to harden and clog up the passages feeding the material into the die. To avoid such clogging, it has been necessary to limit the temperature of the mold and the amount of accelerator in the ceramic slurry so that a substantial period of time is required for the material to set up in the mold. The process of the present invention is unusual since the refrigerated ceramic material is injected into a heated die, such heating tending to cause the ceramic material at the inlet to the die to harden and clog up the inlet. Such clogging would make mass production impossible, but appliacnts have discovered how to minimize heating of the slurry near the mold entrance during heating of the mold. This is accomplished by feeding the ceramic material through a supply tube into the bottom of the mold, passing a refrigerant through a cooling passage adjacent the upper end of said supply tube to maintain the slurry in the tube at low temperature, and minimizing the time for injection of the slurry by using high injection pressures. Thus the slurry which has been refrigerated in the supply tube, is ready for injection in the next molding cycle without any cleaning of the mold entrance or the supply tube and the molding cycle may be repeated over and over again for long periods of time using semi-automatic equipment.

The most effective apparatus is an insulated slurry cell or vessel below the mold having insulated walls surrounding the vessel and pasasges for flow of refrigerant through the vessel to maintain the temperature of the ceramic slurry below 0° C. It is preferable to provide the vertical supply tube with an inner jacket extending at least the major portion of the length of the tube from a point near the top of the tube and with an outer jacket adjacent the peripheral walls of the vessel. The refrigerant which is preferably a liquefied gas having a boiling point below —20° C. is preferably passed from the refrigeration equipment (not shown) directly to the inner jacket so that the temperature of the refrigerant in the inner jacket is always below —20° C, It is preferable to cool the ceramic slurry in the supply tube so that its average temperature is between —75° C. and —20° C.

Because of the tendency of the heated mold to increase the temperature of the slurry at the upper end of the supply tube, it is desirable to provide the die with insulating means made of Micarta or other suitable insulation or otherwise minimize the heat transfer from the die to the supply tube while rapidly removing the heat from the supply tube 56. The nozzle 61 and the die halves 18 and 19 cooperate to prevent heating of the ceramic material at the upper end of said supply tube. Since the metal nozzle is out of contact with the insulating members 71 above and below the O-ring 67, the heat transfer from the die halves to the nozzle is minimized. Since the nozzle is formed of metal, which conducts the heat rapidly to the refrigerant chamber 60, any ceramic material which remains in the nozzle and is not pulled by gravity back into the tube 56 is maintained at a low temperature even when the die halves are heated to a high temperature.

Ceramic cores of very high quality can be produced by the process of this invention when the ceramic slurry is cooled during or immediately after its preparation to a temperature of —75° to 0° C. and stored 12 hours to 10 days at that temperature in a dry inert atmosphere. The temperature of the slurry during such refrigerated storage is sufficienttly low so that the slurry does not gel or harden during this period of time. At the end of this storage the ceramic slurry is injected at low temperature into the mold cavity as described above.

During storage the temperature of the slurry is usually maintained below —20° C., but a somewhat higher temperature up to 0° C. may often be maintained in the slurry vessel 52 during mass production of certain types of cores. The average temperature of the refrigerant in the inner chamber 60, however, is preferably no greater than —20° C. so as to prevent clogging of the nozzle 61 by hardened ceramic material when the mold cavity is heated. During storage the nozzle 61 may be closed by a suitable plug (not shown).

While the process of this invention may be performed using apparatus more simple than that shown in the drawing, as for example when modifying existing equipment, the highest rates of production can be obtained with automatic or semi-automatic equipment. It will be understood that the elements 135, 136 and 137 may be adjusted (or replaced) to provide different water temperatures in accordance with the type of article being made or to vary the rate of heating of the mold cavity. Likewise the refrigerant temperature maintained by the element 103 may be changed.

The timers $T_1$, $T_2$, $T_3$ and $T_4$ may be set to provide any desired time delay. The timer $T_2$ is set to open a predetermined time (i.e., 1 to 5 seconds) after the valve 105 is opened to initiate injection, such time preferably corresponding to that necessary to fill the die cavity as determined by previous tests. The timer $T_4$ is set to open a predetemined time (i.e., 0.5 to 2 minutes) later when the molded core has the necessary rigidity. This time is again determined by preivous tests and is usually less than 3 minutes; but may be 1 minute or less.

The heating of the die cavity is usually initiated when the die cavity is filled but may often be initiated 1 or 2 seconds earlier, particularly if the core is rather thick or the rate of heating of the die is low.

The ceramic material is preferably fed to the mold cavity from the vessel 52 in a few seconds (i.e., 1 to 3 seconds) under a high pressure. The pressure should be sufficient to force all of the residual air or gas out of the mold cavity and to fill the cavity completely with the ceramic slurry. The pressure is preferably 50 to 1200 pounds per square inch gage. Where fine detail and smooth surfaces are essential best results are usually obtained using an inert gas pressure of 100 to 600 pounds per square inch gage. The dies must, of course, be designed to withstand the pressure which is to be applied. If desired, the maximum pressure in the die cavity may be controlled by the hydraulic cylinders 11 and 16 which may yield to permit escape of air at the parting surfaces of the mold.

The rate of injection of the slurry into the mold cavity, the temperature of the slurry, the temperature of the mold halves, the amount of setting accelerator in the slurry and other variables depend on the type of ceramic core or other ceramic mold part being made, and it will be understood that the process to be used should be selected accordingly. Thus, in some instances it may be desirable to maintain the two mold halves at different temperatures during heating of the mold. Also the time for injecting the ceramic slurry into the mold cavity may sometimes be more than 5 seconds.

Unless the context shows otherwisee, the term "parts" means parts by weight and percentages are by weight wherever they appear in the specification and claims.

It will be understood that, in accordance with the provisions of the patent statutes, variations and modifications of the specific methods and machines disclosed herein may be made without departing from the spirit of the invention.

Having described our invention, we claim:

1. A process for mass producing ceramic cores in a closed metal mold comprising preparing a ceramic slurry comprising a major proportion by weight of refractory particles and a minor proportion of a binder for said refractory particles, cooling the slurry to a temperature between −75° C. and 0° C., feeding the refrigerated slurry through a metal supply tube into the mold cavity by applying a pressure to the slurry sufficient to force all of the residual gas out of the mold cavity and to fill the cavity completely in no more than about 3 seconds, heating the mold cavity to cause the slurry to harden rapidly while simultaneously maintaining the temperature of the supply tube at about −20° to −75° C. to prevent hardening of the slurry at the entrance to the mold and in said supply passage, holding said supply tube out of contact with the metal of said mold to minimize heat transfer from said mold to said supply tube, reducing the pressure on said slurry to permit opening of the mold after the pattern in the mold cavity has become rigid, opening the mold, removing the pattern from the mold cavity to complete a first molding cycle, closing the mold, and repeating the cycle by again feeding the refrigerated ceramic slurry through said supply tube into said mold cavity.

2. A process for mass producing ceramic patterns in a closed metal mold from a ceramic slurry comprising a major proportion by weight of refractory particles and a minor proportion of a binder for said refractory particles comprising the steps of maintaining the slurry at a temperature between −75° C. and 0° C. and above the freezing point of the slurry, feeding the refrigerated slurry through an upright metal tube into the mold cavity by applying a pressure of 50 to 1200 pounds per square inch to the slurry to force the residual gas out of the mold cavity and to fill the cavity completely in no more than about 3 seconds, heating the mold cavity to a temperature of about 50° to 150° C. to cause the slurry to harden rapidly while simultaneously cooling the slurry in said supply tube with a refrigerant maintained at a temperature of −20° to −75° C. to prevent hardening of the slurry in said supply tube at the inlet to the mold cavity, maintaining the metal of said mold out of contact with the metal at the discharge end of said supply tube to minimize transfer of heat from said mold to said supply tube while rapidly transferring the heat from said supply tube to said refrigerant, reducing the pressure on said slurry to permit opening of the mold after the pattern in the mold cavity has become rigid, opening the mold, removing the pattern from the mold cavity to complete a first molding cycle, closing the mold, and again feeding the refrigerated ceramic slurry through said supply passage into the mold cavity to initiate a second molding cycle.

3. A process for molding a ceramic pattern in a split die having two halves which fit together to form a mold cavity, motor means for moving said die halves to open and close the die, and fluid passages in said die halves for carrying heating and cooling fluid through the die, said process comprising the steps of forming a ceramic slurry comprising finely comminuted refractory particles and a binder for said particles, maintaining a temperature in said mold cavity between 50° C. and 150° C. when heating fluid is directed to said cavity, placing said ceramic slurry in a closed insulated vessel mounted below the closed die and having an upright supply tube therein extending through the top of said vessel between the inlet to said mold cavity and the bottom portion of said vessel, periodically supplying a dry gas to said vessel at a high pressure by means of a gas valve means, maintaining the temperature of the slurry in said vessel between −75° C. and 0° C., preventing the supply of gas under pressure to said vessel until the die is fully closed, opening said gas valve means to supply the gas to said vessel at a pressure of at least 25 pounds per square inch gage and to initiate rapid flow of the ceramic slurry upwardly through said supply tube, closing said gas valve and initiating the flow of heating fluid through said die a short predetermined period of time after said rapid flow is initiated when the mold cavity is completely filled with ceramic material, venting said vessel a predetermined period of time not in excess of 2 minutes after said rapid flow is initiated to permit gravity flow of the ceramic material in said supply tube, preventing the opening of said die by said motor means until the pressure in said vessel is below a predetermined amount, opening said die, and initiating the flow of cooling fluid through said die before the die is again closed and filled with ceramic material.

4. A process for mass producing ceramic patterns in a closed mold from a ceramic slurry comprising a major portion by weight of refractory particles and a minor proportion of a binder for said refractory particles comprising the steps of cooling the slurry in a reaction vessel with a refrigerant to maintain the temperature between −75° C. and 0° C. and above the freezing point of the slurry, feeding the refrigerated slurry upwardly through an upright tube in said reaction vessel into the mold cavity by applying a gas pressure of 100 to 600 pounds per square inch to the slurry in said vessel to force the residual gas out of the mold cavity and to fill the cavity completely in no more than about 3 seconds, heating the mold cavity to a temperature of about 50° to about 150° C. to cause the slurry to harden rapidly while simultaneously maintaining the upper portion of said supply tube in contact with said refrigerant to prevent hardening of the slurry in said supply tube at the inlet to the mold cavity, reducing the pressure on said slurry to permit opening of the mold after the pattern in the mold cavity has become rigid and causing the slurry near said inlet which has been warmed by the die to flow a substantial distance back into said supply tube and to be cooled by said refrigerant, opening the mold, removing the pattern from the mold cavity to complete a first molding cycle, closing the mold, and again feeding the refrigerated ceramic slurry through said supply tube into the mold cavity to initiate a second molding cycle.

5. A process for mass producing ceramic patterns in a closed mold from a ceramic slurry comprising a major portion by weight of refractory particles and a minor proportion of a binder for said refractory particles comprising the steps of cooling the slurry in a reaction vessel with a refrigerant to maintain the temperature between −75° C. and 0° C. and above the freezing point of the slurry, feeding the refrigerated slurry upwardly through an upright tube in said reaction vessel into the mold cavity by applying a gas pressure of 50 to 1200 pounds per square inch to the slurry in said vessel to force the residual gas out of the mold cavity and to fill the cavity completely in no more than about 3 seconds, heating the mold cavity with a heating fluid at a temperature of about 200° to bout 250° F. to cause the slurry to harden rapidly while simultaneously maintaining the upper portion of said supply tube in contact with said refrigerant to prevent hardening of the slurry in said supply tube at the inlet to the mold cavity, reducing the pressure on said slurry to permit opening of the mold after the pattern in the mold cavity has become rigid and causing the slurry near said inlet which has been warmed by the die to flow a substantial distance back into said supply tube and to be cooled by said refrigerant, opening the mold, removing the pattern from the mold cavity to complete a first molding cycle, closing the mold, and again feeding the refrigerated ceramic slurry through said supply tube into the mold cavity to initiate a second molding cycle.

6. A process for molding a ceramic article in a split metal die having two halves which fit together to form a mold cavity, motor means for moving said die halves to open and close the die, and fluid passages in said die halves for carrying heating and cooling fluid through the metal die, said process comprising the steps of forming a ceramic slurry comprising finely comminuted refractory particles and a binder for said particles, heating said mold cavity periodically with a heating fluid at a temperature of about 200° to 250° F., placing said ceramic slurry in a closed insulated vessel mounted below the closed metal die and having an upright supply tube therein extending through the top of said vessel between the inlet to said mold cavity and the bottom portion of said vessel, periodically supplying a dry gas to said vessel at a high pressure by means of a gas valve means, maintaining the temperature of the slurry in said vessel between —75° C. and 0° C., preventing the supply of gas under pressure to said vessel until the die is fully closed, opening said gas valve means to supply the gas to said vessel at a pressure of 50 to 1200 pounds per square inch gage and to initiate rapid flow of the ceramic slurry upwardly through said supply tube, closing said gas valve and initiating the flow of heating fluid through said die a short predetermined period of time after said rapid flow is initiated when the mold cavity is completely filled with ceramic material, venting said vessel a predetermined period of time not in excess of 2 minutes after said rapid flow is initiated to permit gravity flow of the ceramic material in said supply tube, preventing the opening of said die by said motor means until the pressure in said vessel is below a predetermined amount, opening said die, initiating the flow of cooling fluid through said die before the die is again closed and filled with ceramic material, and again feeding the refrigerated ceramic slurry through said supply tube to initiate a second molding cycle, the upper end portion of said supply tube being cooled with a refrigerant at a temperature of about —20° to —75° C. and being held out of contact with the metal of the mold to minimize heating of the slurry in said supply tube.

References Cited by the Examiner
UNITED STATES PATENTS

| | | | |
|---|---|---|---|
| 2,320,594 | 6/1943 | Hempel | 18—30 |
| 2,330,601 | 11/1943 | Tucker | 18—30 |
| 2,765,512 | 10/1956 | Hesbit | 264—28 |
| 2,846,726 | 8/1958 | Bean | 264—28 |
| 2,893,102 | 7/1959 | Maxwell | 264—28 |
| 3,160,931 | 12/1964 | Leach | 22—193 X |

ROBERT F. WHITE, *Primary Examiner.*

ALEXANDER BRODMERKEL, *Examiner.*